United States Patent [19]

Aro

[11] 4,352,519
[45] Oct. 5, 1982

[54] LATCHING GLARE SHIELD

[75] Inventor: Ernesto M. Aro, Torrance, Calif.

[73] Assignee: Orion Industries, Inc., Compton, Calif.

[21] Appl. No.: 186,245

[22] Filed: Sep. 11, 1980

Related U.S. Application Data

[63] Continuation-in-part of Ser. No. 60,726, Jul. 25, 1979, abandoned.

[51] Int. Cl.³ .............................................. B60J 3/02
[52] U.S. Cl. ............................... 296/97 G; 24/259 R
[58] Field of Search ................ 296/97 G, 97 R, 97 F, 296/97 J; 16/DIG. 13, 171, 172, 169, 150; 24/259 R

[56] References Cited

U.S. PATENT DOCUMENTS

| | | | |
|---|---|---|---|
| 2,097,419 | 10/1937 | Schmidt | 24/259 R |
| 3,304,118 | 2/1967 | Jonas | 296/97 G |
| 4,167,287 | 9/1979 | Franklin | 296/97 G |
| 4,280,730 | 7/1981 | Turner | 296/97 G |

*Primary Examiner*—Robert R. Song
*Attorney, Agent, or Firm*—Fulwider, Patton, Rieber, Lee & Utecht

[57] ABSTRACT

An automotive vehicle sun visor is provided with an improved glare shield in which a flat sheet of glare reducing plastic is hinged to a backing and secured to the sun visor by means of metal clips inserted in the backing. The backing has a latch adapted to receive the edge of the glare reducing sheet opposite the hinge when the glare reducing sheet is folded into face to face relationship with the backing.

7 Claims, 5 Drawing Figures

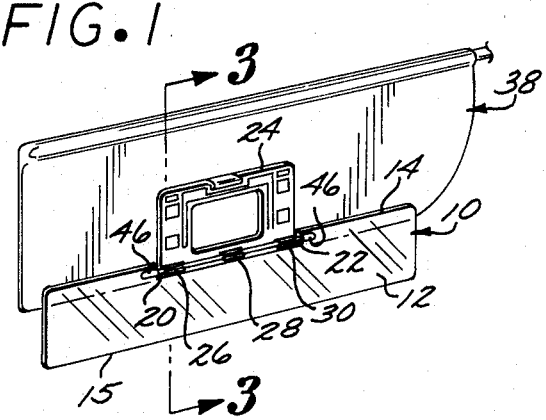
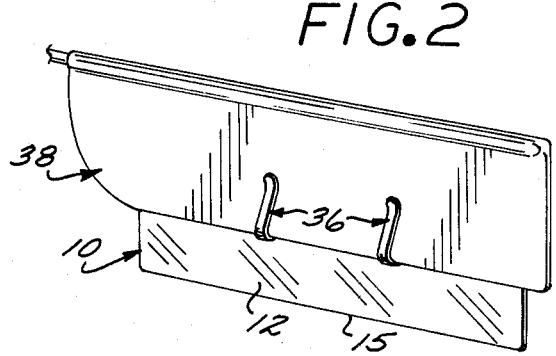
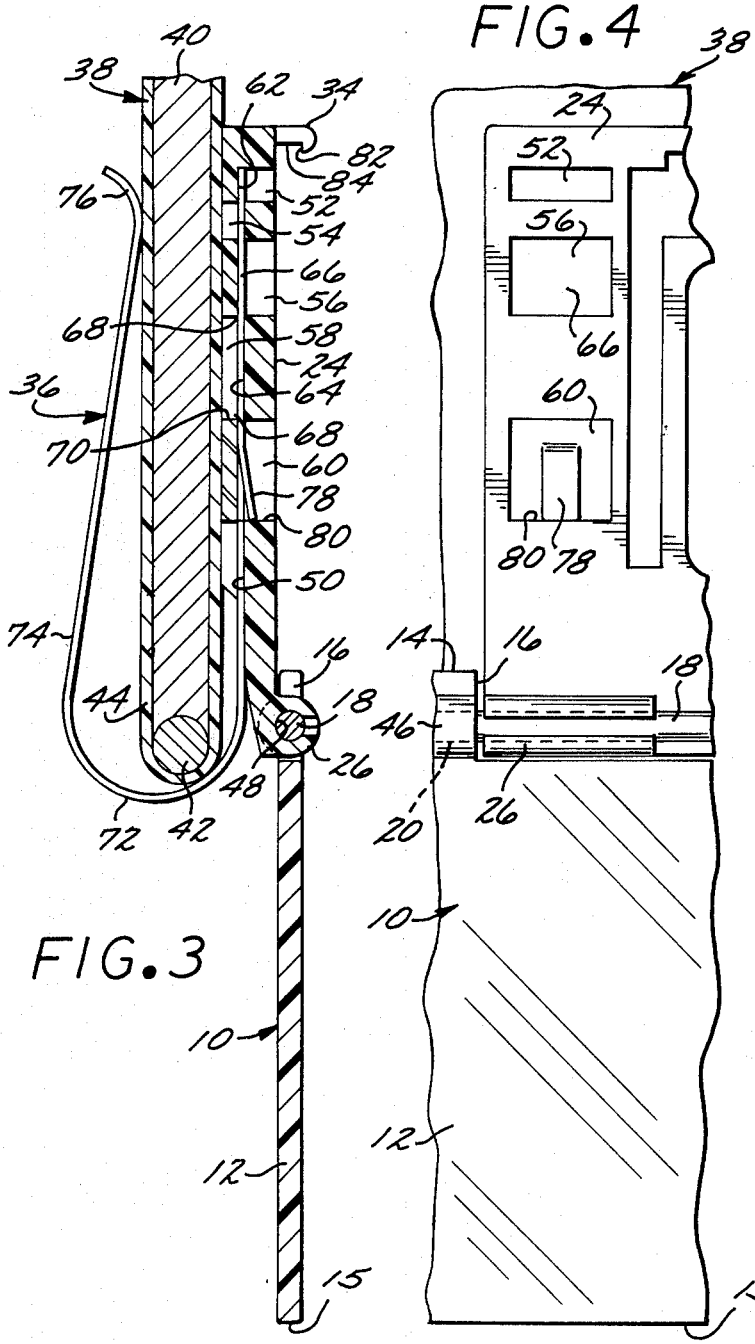
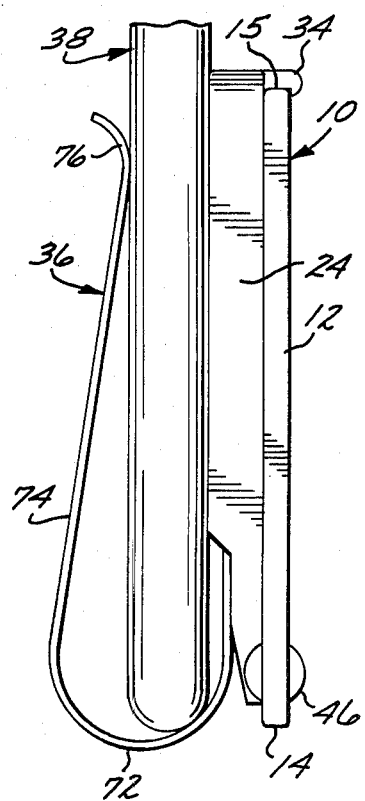

LATCHING GLARE SHIELD

This is a continuation in part of U.S. application Ser. No. 60,726, filed July 25, 1979 now abandoned.

BACKGROUND OF THE INVENTION

1. Field of the Invention

The present invention relates to automotive vehicle glare reducing shields for use on vehicle sun visors.

2. Description of the Prior Art

In the past, various sun visor extensions have been devised to serve as transparent extensions of an automotive vehicle sun visor. Such vehicle sun visors are conventionally foldably located near the upper boundary of a vehicle windshield. Sun visors of conventional design are opaque and are intended to serve as an optical shield at the upper portion of a windshield to prevent solar or other reflective glare from impairing a vehicle driver's vision. While the opaque sun visors perform this function under some glare conditions, many situations arise in which glare or high light level is directed through the windshield beneath the visor to nevertheless impair a driver's visual observation of road and traffic conditions. While conventional transparent shields have been provided and fixed to a vehicle sun visor, such devices of conventional design have had certain limitations.

Many conventional transparent sun visor extension glare shields are not adapted to be folded flat into juxtaposition against an automotive vehicle sun visor when not in use. Rather, they have been affixed to the vehicle sun visor as rigid, readily noticeable, unsightly extensions thereof. Also, while useful under high glare conditions, such fixed sun visor extensions impair vision when glare is not a problem.

Other glare shield extensions which have been designed for rotation about a bracket secured to the sun visor for storage purposes have not operated satisfactorily. Many such devices are constructed with plastic hinges or knuckles which are secured by friction to an axle or rod about which they are rotated. While the force of friction of the hinge knuckles on the horizontal mounting rod will hold the glare reducing sheet folded up in a stored position the first few times it is used, the plastic hinge knuckles rapidly tend to partially lose their elasticity, so that insufficient frictional force is present between the plastic hinge knuckles and the mounting rod to hold the glare reducing sheet upright in a position stored behind the sun visor. As a result, the glare reducing shield tends to flop downward and oftentimes assumes a position somewhere between its fully extended downwardly depending position, and its fully folded position behind the sun visor. This is both annoying and dangerous to the vehicle operator, and is especially irritating when the vehicle is traveling over rough and bumpy roads. Under such conditions the visor extension tends to tilt from behind the sun visor with considerable frequency. The vehicle operator's attention is thereupon distracted to a significant degree while the vehicle is traveling over surfaces which especially warrant the operator's undivided attention.

Various attempts have been made to adjust the diameter of the visor extension hinge pin and the plastic knuckle configuration to achieve a fit which is tight enough to allow the glare reducing shield to be positioned as desired and held in place by the force of friction between the plastic knuckles and the hinge pin. However, in each case the plastic knuckles deform inelastically over a relatively short period of time so that a tight friction fit between the plastic knuckles and the hinge pin cannot be maintained.

SUMMARY OF THE INVENTION

One object of the invention is to provide a tinted transparent shield which can serve as an extension of an automotive vehicle sun visor to prevent ambient sunlight and glare from impairing a driver's visability when glare conditions exist. Furthermore, the invention allows the transparent shield to be rotated upwardly out of the driver's view and to be clipped in position behind the vehicle sun visor so that it does not rotate downwardly unless such downward rotation is desired. For this purpose the sun visor extension is provided with a snap fastening catch formed on a plastic backing to which the glare reducing shield is hingedly secured. The snap fastening catch is on the outwardly facing side of the plastic backing, the other side of which is disposed in contact with the vehicle sun visor. The snap fastening catch is formed on the edge of the plastic backing opposite the parallel edge thereof which bears the knuckles used to engage the shield hinge pin. In the preferred embodiment of the invention, the plastic backing is of only slightly greater width than the glare reducing lens of the shield, so that a finger formed on an edge of the plastic backing extends outwardly and is used to secure the glare reducing shield when desired. The outwardly extending finger preferably has a widened tip which is rounded so that rotation of the glare reducing shield into juxtaposition against the backing resiliently cams the tip of the finger away from the hinge pin, and allows the finger to elastically return to position to capture the glare reducing lens of the shield.

Another object of the invention is to provide metal spring biasing gripping devices which will securely fasten the glare reducing shield to an automotive vehicle sun visor. Plastic clips of this type have proven inadequate, since over a period of time the plastic from which the clips are constructed tends to inelastically deform. Such clips therefore are unable to exert sufficient frictional force on the sun visor to allow the sun shield to remain properly positioned relative to the sun visor. That is, plastic clips tend to inelastically deform to a slight degree over a period of time, and do not grip the sun visor with sufficient frictional force. Rather, they tend to come loose with age.

The glare shield of the invention may be removeably clipped onto the automotive vehicle sun visor and the shield lens is folded downwardly from the lower edge thereof to serve as a transparent extension of the sun visor. Alternatively, the lens of the sun shield of the invention may be folded upwardly to bring the sheet of transparent glare reducing plastic into position against the backing, and in releasable securement thereto by means of the fastening catch formed on the backing. The glare reducing plastic sheet may thereby be unobstructively stored behind the vehicle sun visor, largely or completely out of view of the vehicle occupants.

Preferably, the metal spring biased clips are permanently lodged in sockets in the glare shield backing. By constructing the backing with protuberances which extend into the sockets which are adapted to receive the clips, and by forming the metal clips with burrs which interact with the structure of the backing to prevent dislodgement of the spring clips from the sockets, a sun shield extension is formed which grips the sun visor tenaciously. The clips of the sun shield of the invention do not relax their grip over a period of time, as occurs with plastic clips.

The backing of the sun visor extension of the invention may be rotatably attached to a lens formed of a sheet of transparent, glare reducing plastic by means of a metal bar molded directly into the transparent plastic sheet. The backing to which the glare reducing lens is hingedly attached includes snap fastening plastic knuckles into which longitudinally extending openings are defined. The metal hinge pin molded into the plastic glare reducing sheet may be forced into these openings. The openings in the knuckles are of a width equal to or slightly smaller than the diameter of the metal bar, but the knuckles are sufficiently elastic so that they may be snapped onto the bar in rotatable engagement therewith.

Another object of the invention is to provide a glare shield with a backing that can be injection molded, rather than extruded in the manner of conventional clips. By providing a backing using an injection molding technique, the cross section of the backing need not be uniform throughout, as with extruded devices which must be transversely sliced into discrete units following formation. An injection molded backing can thereby be formed with adjacent cavities alternatingly defined in opposite sides of the backing to overlap in a direction normal to the alignment of the clips.

The glare shield of the invention is also designed for releasable attachment to an automotive vehicle sun visor, but without inadequate gripping of the sun visor as is the case with many conventional sun visor extensions. Rather, the backing employs a flat generally rectangular frame with a generally rectangular opening therein and with sockets therein adapted to receive metal spring clips that squeeze the structure of the sun visor between the backing and the structure of the metal clips. Although the glare shield of the invention can be easily manually removed from the vehicle sun visor, the metal spring clips will retain their resiliency over extended periods of time so that the means of attachment to the sun visor does not become loose and insecure with the passage of time.

Preferably the sockets into which the clips extend are formed by adjacent molded cavities alternatingly defined in opposite sides of the backing to overlap and receive a leg of a spring clip which is inserted normal to the direction of the depth of the cavities. Also, the metal spring clip and backing are preferably configured so that once the metal clips are inserted into the sockets in the backing, they are permanently secured therein.

The invention may be described with clarity and particularity by reference to the accompanying drawings.

DESCRIPTION OF THE DRAWINGS

FIG. 1 is a perspective view of the glare shield of the invention in an extended position with the vehicle sun visor disposed in one orientation.

FIG. 2 is a perspective view of the glare shield of the invention in an extended position on the vehicle sun visor oriented in a different position.

FIG. 3 is a sectional elevational view taken along the lines 3—3 of FIG. 1.

FIG. 4 is an elevational detail of a portion of FIG. 1.

FIG. 5 is a side elevational view of the structure of FIG. 1 showing the glare shield retracted and latched against the sun visor.

DESCRIPTION OF THE EMBODIMENT

FIG. 1 illustrates a glare shield 10 for an automotive vehicle comprising a flat, generally rectangular injection molded sheet or lens 12 of transparent optical grade, glare reducing plastic, preferably polycarbonate. The lens 12 has a hinging edge 14 which defines an elongated shallow channel 16 at its center. An opposite edge 15 is defined parallel to the hinging edge 14. An elongated cylindrical metal hinge pin 18 is provided with its ends molded into the lens 12 so that the hinge pin 18 spans the width of the channel 16. A plastic backing 24, shaped generally in the form of a rectangular ring with rounded corners, has several snap fastening knuckles 26, 28 and 30, which are rotatably secured to the hinge pin 18 in the channel 16. The backing 24 has a snap fastening catch 34 formed thereon opposite the knuckles 26, 28 and 30. The snap fastening catch 34 is adapted for releasable engagement with the glare reducing plastic lens 12. The catch 34 is used to hold the plastic lens 12 and the backing 24 in face to face disposition, as depicted in FIG. 5. Metal spring biasing gripping clips 36 are inserted into the backing 24 and are disposed thereon at either end and on the side of the backing 24 opposite the glare reducing plastic lens 12. The clips 36 removeably secure the backing 24 to an automotive vehicle sun visor 38.

The automotive vehicle sun visor 38 is of any conventional style, which may include a batting or foam filled interior 40 wholly or partially circumscribed by a metal wire frame 42 and encompassed within a fabric or plastic casing 44. The sun visor 38 is of an oblong configuration, generally rigid in shape, but with resilient side surfaces.

The lens 12 is provided in a glare reducing color, such as smoke gray, and has slightly rounded corners for safety and aesthetic purposes. The lens 12 is a unitary sheet-like structure and is flat throughout except for an molded enlargements 46 defined at opposite ends of the channel 16 where the ends 20 and 22 of the hinge pin 18 are embedded during molding.

The generally rectangular plastic backing 24 is formed with knuckles 26, 28 and 30 spaced along one edge thereof. One of the knuckles 26 is illustrated in detail in FIG. 4. The knuckles 26, 28 and 30 are formed as open sided sleeves with a longitudinal slot therein that defines a trough or concave channel 48, as illustrated in FIGS. 3 and 4. The slots in the knuckles 26, 28 and 30 are formed with a width essentially the same as or very slightly smaller than the diameter of the hinge pin 18. This construction allows the knuckles 26, 28 and 30 to be forced onto the hinge pin 18 in rotatable engagement therewith, but with a fit sufficiently close so that some force is required to overcome the friction in order to rotate the lens 12 relative to the backing 24. However, it must be recognized that after a relatively short period of use the plastic from which the backing 24 is constructed will slightly inelastically deform so that the lens 12 will assume only two stable positions. When unlatched, the lens 12 will drop to the extended position depicted in FIGS. 1–3. When it is desired to store the lens 12 out of view behind the sun visor 38, the lens is rotated upwardly to the position of FIG. 5 and secured with the catch 34.

The backing 24 is constructed as a generally rectangular, ring-like frame with a plurality of sockets 50 that extend away from the knuckles 26, 28 and 30 toward the opposite edge of the backing 24. The sockets 50 are formed by adjacent molded cavities 52-60 which are alternatingly defined in opposite sides of the backing 24 as illustrated in FIGS. 3 and 4. The cavities 52-60 overlap in a direction normal to the alignment of the clips 36. That is, for example, the cavity 52, as depicted in FIG. 3, extends to the right from the surface 62 of the backing 24 to a depth which overlaps the depth of the cavity 54 that is defined in the opposite surface 64 of the backing 24. The cavities 54 and 58 are defined in the surface 64 and extend to the left, as viewed in FIG. 3, while the cavities 52, 56 and 60 are defined in the surface 62 and extend to the right as viewed in that same drawing figure. The cavities 52-60 are dimensioned so as to define the sockets 50 as longitudinal slots each adapted to receive a leg 66 of a spring clip 36, as depicted in FIG. 3.

The cavity 58 is defined in the structure of the backing 24 with protruding ridges 68 extending transversely across the cavity floor 70. The transverse ridges 68 frictionally engage the clip 36, and impart a slight bend to the leg 66 of the clip 36 to further enhance the frictional engagement thereof in the socket 50 of the backing 24, and to enhance the spring bias of the clip 36.

The spring clips 36 each fit into a separate socket 50, and are defined as hairpin-like structures which have a linear leg 66 that terminates in a hairpin loop 72. From the loop 72 the structure of the spring clip 36 extends to form an inclined opposing leg 74 that terminates in an arcuate turned out tip 76, as depicted in FIGS. 3 and 5. The tip 76 is spring biased toward the leg 66 of the clip 36 to effectuate contact therewith unless some structure is inserted therebetween. As depicted in FIGS. 2, 3 and 5, the clip 36 is normally inserted onto the lower edge of the sun visor 38 and is pushed upwardly toward the top thereof until the structure of the edge of the sun visor 38 contacts the loop 72 of the spring clip 36. The tip 76 of the spring clip 36 thereby bears against the sun visor 38 and squeezes the sun visor 38 between the clip 36 and the structure of the backing 24. The spring clips 36 thereby firmly grip the structure of the sun visor 38, and do not become inelastically deformed with extended use as do plastic clips.

The linearly extending leg 66 of the clip 36 includes a burr 78 which is stamped out of the clip structure to angle outwardly therefrom at an angle in a linear direction toward the loop 72. When the leg 66 of each spring clip 36 is inserted into a socket 50, the burr 78 is first pressed toward the plane of the linear leg 66, and then springs outwardly in the cavity 60 when the spring clip is fully inserted into the socket 50. The burr 78 thereafter bears against the side wall 80 of the cavity 60 to retard, and even prevent the withdrawal of the clip 36 from the socket 50, once it has been inserted therein.

The snap fastening catch 34 on the backing 24 is unitarily formed with the backing 24 as a transversely extending finger with a rounded, widened tip 82. The tip 82 is undercut at 84 to provide a bearing surface. The catch 34 receives and fits over the edge 15 of the lens 12 remote from the hinging edge 14 and captures the edge 15 to hold the lens 12 and the backing 24 in face to face relationship, as illustrated in FIG. 5. As the lens 12 is rotated counterclockwise from the position of FIG. 3, the extremity of the lens structure at the edge 15 contacts the tip 82 and cams it out of the way. The catch 34 snaps downwardly in elastic fashion once the edge 15 of the lens 12 is received within the grasp of the bearing surface 84 as illustrated in FIG. 5. The catch 34 may be easily disengaged from the edge 15 by using one's fingertips to pry the edge 15 of the lens 12 out of the grasp of the catch 34, whereupon the lens 12 is rotatable downward to the position of FIGS. 1-3.

Undoubtedly, numerous variations and modifications of the invention will become apparent to those familiar with automotive vehicle glare reducing shields. Accordingly, the scope of the invention should not be construed as limited to the specific embodiment depicted, but rather is defined in the claims appended hereto.

I claim:

1. A glare shield of an automotive vehicle sun visor comprising a flat sheet of molded transparent glare reducing plastic having a hinging edge defining an elongated, shallow channel at its center and an opposite parallel edge, a metal hinge pin having ends molded into said sheet at said hinging edge to span the width of said channel, a plastic backing having unitary knuckle means rotatably secured to said hinge pin in said channel and having a snap fastening catch formed thereon opposite said knuckle means for releasable engagement with said opposite parallel edge of said glare reducing plastic sheet to hold said sheet and said backing in face to face disposition, said backing being constructed with a plurality of sockets extending away from said knuckle, and metal spring biased gripping means inserted into said backing and disposed thereon opposite said glare reducing plastic sheet for removably securing said backing to said automotive vehicle sun visor, said gripping means including a plurality of clips, each of which fits into a separate one of said sockets and has retaining means for interacting with the structure of said backing at said sockets to retard the withdrawal of said clips from said sockets.

2. A glare shield according to claim 1 further characterized in that said sockets are formed with adjacent molded cavities alternatingly defined in opposite sides of said backing to overlap in a direction normal to the alignment of said clips.

3. A glare shield according to claim 1 further characterized in that said snap fastening catch is unitarily formed with said backing as a transversely extending finger with a widened tip.

4. A glare shield according to claim 3 further characterized in that said fingertip is rounded, whereby movement of said glare reducing plastic sheet into face to face relationship with said backing cams said fingertip out of the way of said opposite edge of said sheet, to receive said opposite edge with said fingertip capturing said opposite edge of said glare reducing sheet.

5. A glare shield for an automotive vehicle sun visor comprising a flat sheet of molded transparent glare reducing plastic having a hinging edge defining an elongated, shallow channel at its center and an opposite parallel edge, a metal hinge pin having ends molded into said sheet at said hinging edge to span the width of said channel, a plastic backing having unitary knuckle means rotatably secured to said hinge pin in said channel and having a snap fastening catch formed thereon opposite said knuckle means for releasable engagement with said opposite parallel edge of said glare reducing plastic sheet to hold said sheet and said backing in face to face disposition, said backing being constructed with a plurality of sockets extending away from said knuckle, and metal spring biased gripping means inserted into said backing and disposed therein opposite said glare reducing plastic sheet for removably securing said backing to said automotive vehicle sun visor, said gripping means including a plurality of clips, each of which fits into a separate one of said sockets, said clips being constructed with burrs which interact with the structure of said backing at said sockets to retard the withdrawal of said clips from said sockets.

6. A glare shield according to claim 5 further characterized in that protruding means are defined in the structure of said backing to extend into said sockets, to frictionally engage said clips.

7. A glare shield according to claim 5 further characterized in that said burrs are stamped out of the structure of said clip to permanently lock against the structure of said backing defining said cavities to prevent the withdrawal of said clips once said clips are inserted into said sockets.

* * * * *

Disclaimer 4,352,519—*Ernesto M. Aro*, Torrance, Calif. LATCHING GLARE SHELD. Patent dated Oct. 5, 1982. Disclaimer filed Mar. 29, 1989, by the assignee, Mr. Gasket Co.

Hereby enters this disclaimer to the entire term of said patent.
[*Official Gazette May 23, 1989*]